Oct. 25, 1949.  A. P. YAROS  2,486,088
OIL SEAL
Filed Feb. 19, 1945
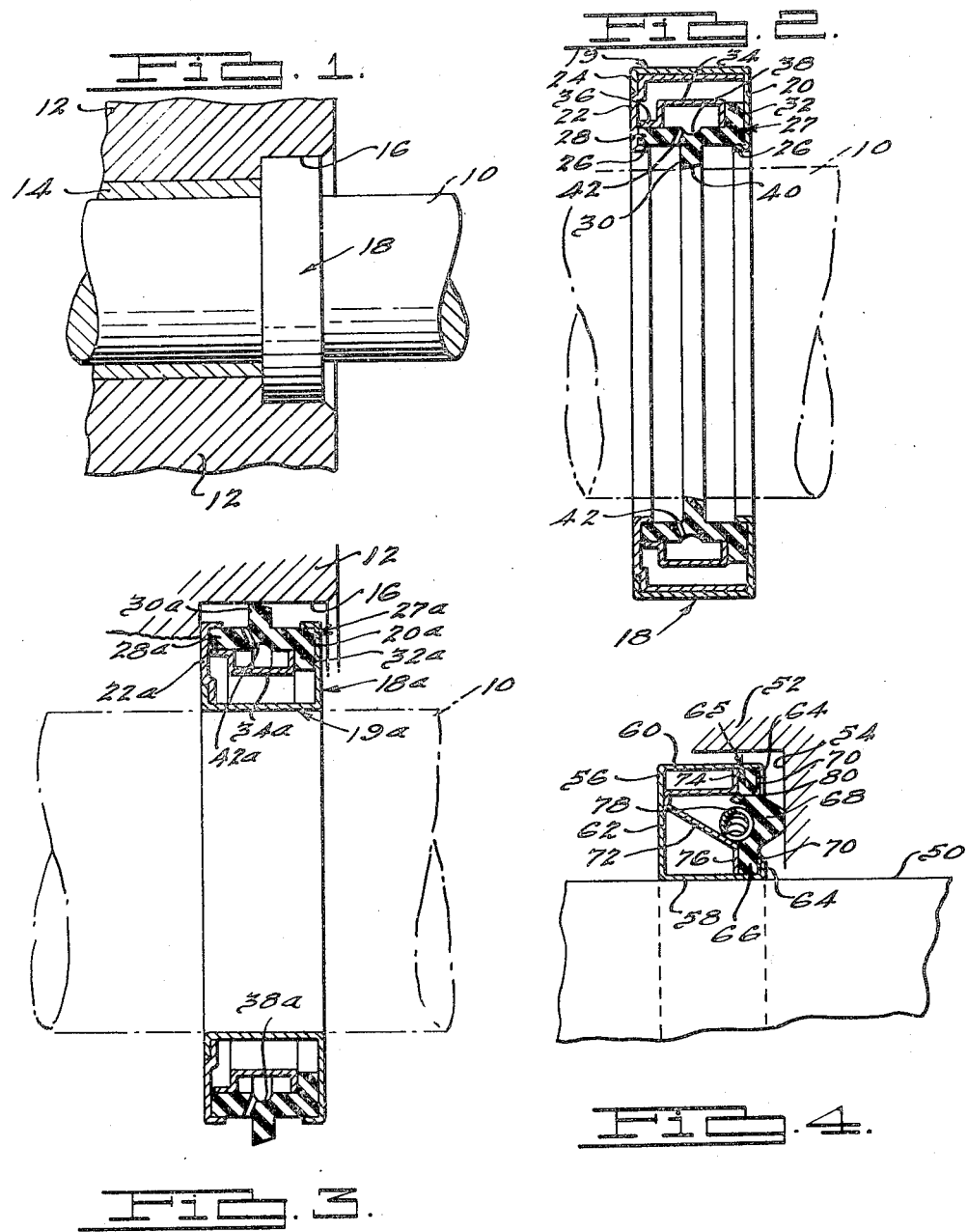
INVENTOR.
Anthony P. Yaros.
BY
Harness, Dickey & Pierce
ATTORNEYS.

Patented Oct. 25, 1949

2,486,088

UNITED STATES PATENT OFFICE 2,486,088

OIL SEAL

Anthony P. Yaros, Dearborn, Mich.

Application February 19, 1945, Serial No. 578,687

4 Claims. (Cl. 288—3)

1

This invention relates to oil or grease seals of the type adapted to surround a rotating shaft to prevent the escape of fluid between the shaft and a housing surrounding the same.

Objects of the invention include the provision of a shaft seal provided with an elastic and readily deformable sealing member mounted in such a manner as to be readily yieldable in a direction normal to a surface in running contact therewith so as to effect an efficient seal regardless of minor variations in size of such surface through wear or otherwise; the provision of a seal of the type described in which the sealing element comprises a member of rubber or rubberlike material of generally T-section suitably mounted in a cooperating rigid cage in such a manner as to permit the leg of the T to shift bodily in the direction of the length thereof; the provision of a construction as above described in which the cage is of hollow annular formation provided with an annular slot through which the leg of the T of the sealing member is adapted to project, the sealing member being maintained in contact with the cage on opposite sides of the slot by a rigid supporting member engaging the sides of the sealing member only and being generally spaced in the central portion thereof; and the provision of a shaft seal of the type described that is simple in construction, efficient in operation and economical to manufacture.

The above being among the objects of the present invention, the same consists in certain novel features of construction and combinations of parts to be hereinafter described with reference to the accompanying drawing, and then claimed, having the above and other objects in view.

In the accompanying drawing which illustrates suitable embodiments of the present invention and in which like numerals refer to like parts throughout the several different views, Fig. 1 is a fragmentary sectional view taken longitudinally through a shaft and housing assembly provided with an oil seal operatively associated therebetween and constructed in accordance with the present invention;

Fig. 2 is an enlarged, diametrical sectional view of the oil seal shown in Fig. 1;

Fig. 3 is a view similar to Fig. 2 but of a modified form of construction in which the parts are radially reversed; and, Fig. 4 is a fragmentary sectional view taken diametrically through an additional modified form of the present invention wherein the sealing flange contacts a sealing face normal to the axis of the shaft.

2

In the form of the invention shown in Figs. 1 and 2 the seal is shown as encircling a rotatable shaft 10 which is relatively rotatably mounted in a housing generally indicated at 12 by means of a conventional bearing bushing 14. Outwardly of the bushing 14 the bore of the housing 12 in which the shaft 10 is received is cylindrically enlarged or counterbored as at 16 and receives therein the oil or grease seal generally indicated in Fig. 1 at 18 in cooperating relationship with respect to the shaft 10. The seal 18 is preferably press fitted into the counterbore 16.

Now referring to Fig. 2 it will be noted that the grease seal 18 comprises a rigid shell or housing 19 formed by a pair of angularly sectioned housing members 20 and 22 the latter being telescopically received in the former, and the former having a radially inturned free edge portion 24 serving to lock the two housings 20 and 22 together. Each housing portion 20 and 22 is provided with an axially inwardly turned radially inner marginal flange 26 of the same diameter and of slightly greater diameter than the shaft 10 and arranged in axially opposed but in relatively widely axially spaced relation with respect to each other. The space between the free edges of the flanges 26 forms a slot in the radially inner wall of the housing 19. Within the housing 19 is received an annular sealing element indicated generally at 27 which, in accordance with the present invention, is essentially T-shaped in section, the head 28 thereof being of a width to bridge the opposite sides of the housing 19 and lying against the radially outer faces of the flanges 26. The sealing element 27 is provided with a central radially inwardly projecting leg portion 30 adapted to contact the surface of the shaft 10 as indicated in Fig. 2. That end of the head 28 on the T-sectioned sealing member or element 27 opposite that end of the seal in contact with the oil, grease or other fluid to be sealed against escape between the shaft 10 and housing 12 is provided with an annular radially outwardly projecting integral flange 32 lying in contact with the corresponding end wall of the shell or housing 19. The sealing element or member 27 is preferably formed from a suitable pliable and readily yieldable resilient material such as rubber, either natural or synthetic, or suitable material of similar characteristics.

In order to maintain the outer edges of the head portion 28 of the sealing element 27 in engagement and preferably sealing contact with the flanges 26 an annular sheet metal ring 34 is positioned within the shell or housing 19 in radially outwardly encircling relation with respect to the sealing element 27. It will be noted that the member 34 is generally of U-shaped section arranged with its open face in contact with the radially outer face of the sealing element 27 and with one side wall thereof in contact with the axially inner face of the flange 32 of the sealing element which it serves to press against the corresponding side wall of the shell or housing 19. At its opposite end the member 34 is provided with an axially outwardly extending flange 36 lying in contact with the radially outer face of the corresponding end of the head 28 of the sealing element and preferably in engagement with the corresponding side wall of the shell or housing 18.

Preferably and as brought out in Fig. 2 the side walls of the member 34 engage the head 28 of the sealing element 27 in axially outwardly spaced relation with respect to the plane of the sides of the leg 30 thereof so as to leave a material width of the head 28 of the sealing element 27 substantially unrestricted against radially outward movement into the hollow interior of the member 34. The flexibility of the sealing members in this respect may be accentuated by providing it with an annular groove such as 38 on its radially outer face and preferably substantially in the plane of the leg 30 thereof as shown.

In the construction shown in Fig. 1 it is assumed, of course, that it is intended to seal the space between the shaft 10 and housing 12 against the escape of oil along the bearing 14 to the right as viewed in Fig. 1. It will be appreciated that in such case the inner effective diameter of the leg 30 of the sealing element is such as to rub upon the surface of the shaft 10 passing therethrough and, preferably as shown in such case the radially inner edge of the leg 30 is beveled as at 40 radially inwardly and axially to the left as viewed in Fig. 1 so as to present a relatively narrow edge for contact with the shaft 10.

In view of the relative radial flexibility of that portion of the sealing element which centers in the leg 30 the inner diameter of the leg 30 may initially be materially smaller than the diameter of the shaft to be received therein so that in assembling it upon the shaft the central portion of the sealing element will flex upwardly within the hollow interior of the member 34, and as the radially inner edge of the leg 30 wears during service the resiliency of the sealing element and its tendency to contract its central diameter under such circumstances will continue to maintain an effective sealing pressure between the radially inner edge of the leg 30 and the shaft.

Grease tending to flow along the shaft 10 past the oil seal thus provided is prevented from escaping around the sealing element between it and the shell or housing 18 because of the fact that the member 34 maintains the outer ends of the head 28 of the sealing element 27 in contact with the flanges 26 and it also serves to maintain the flange 32 thereof in sealing relationship with respect to the corresponding side of the shell or housing 19.

However, it will be appreciated that if such oil, grease or other fluid which attempts to escape along the shaft 10 is under a positive pressure, this pressure acting against the radially inner surface of the sealing element over a radially outwardly unsupported portion thereof might have the effect of radially expanding it and thus destroy the seal between the leg 30 and the shaft. In order to prevent any such possibility a plurality of holes such as 42 are preferably provided in the head 28 of the T sealing element 27 on the axially inner side of the leg 30 with respect to the direction of such pressure, so as to transmit such pressure to within the member 34. In such case it will be appreciated that if a pressure of the type described develops, in being transmitted to the interior of the member 34 it acts not only on the radially inner side of the head 28 on one side of the leg 30 but also on the radially outer side thereof so as to balance such pressure, and in addition acts over a further axial dimension of the radially outer face of the sealing element so as in effect to establish a preponderance of pressure on the radially outer side of the sealing element 27 tending to contract it radially about the shaft 10. Thus it will be appreciated that by the provision of the holes 42 the structure becomes more positive in its sealing effect the greater the pressure of the fluid tending to escape between it and the shaft.

It will, of course, be appreciated that instead of pressing the shell or housing 18 into the housing surrounding the shaft with the leg or radial flange 30 of the sealing element in rubbing contact with the surface of the shaft, the arrangement may be radially reversed. Such construction is illustrated in Fig. 3 wherein parts equivalent to the first described construction are illustrated by the same numerals except that such numerals bear the sub-letter a. In this case the shell or housing 18a, which is the same as the housing 18 except radially reversed, is pressed upon the shaft 10 and the leg 30a is arranged in rubbing contact with the peripheral wall of the bore or counterbore 16. The construction being otherwise identical to the first described construction and all the various parts function in the same manner no further description of this modification is believed to be required.

In Fig. 4 a modification of the present invention applied between the shaft and the housing is illustrated where the seal is effected through a surface normal to the axis of the shaft. As in the previous case the shell or housing of the device may be either press fitted to the shaft or to the housing and in the former case the leg of the T-sectioned sealing element will be in rubbing contact with a surface of the housing and in the latter case with a surface rotating with the shaft. As a matter of illustration the former case is shown, the shaft here being indicated at 50 and the housing generally at 52, the latter having a plane face 54 arranged in a plane perpendicular to the axis of the shaft 50.

The shell or housing 56 of the oil seal in this last case is shown as of a one-piece construction generally square in cross-section and formed of one-piece to provide imperforate radially inner and outer spaced walls 58 and 60, respectively, an imperforate end wall 62, and inwardly turned annular marginal flanges 64 at the free ends of the walls 58 and 60, the latter being located in a common plane in a manner similar to the flanges 26 of the first described construction and being spaced to provide the effect of an annular slot in the wall formed thereby.

The sealing element 65 in this case is more or less of T-section having a head portion 66 and central concentric leg 68 projecting axially outwardly therefrom in rubbing engagement with respect to the surface 54 of the housing 52. A pair of metal or other rigid rings 70 are preferably (but not necessarily) provided, as shown, in this case under the flanges 64 and between such flanges and the outer ends of the head 66 of the T of the sealing element 65. The sealing element 65 is maintained in contact with the rings 70 by means of a sheet metal backing member 72 of more or less U or channel section and provided with a radially outwardly directed annular flange 74 at the free marginal edge of its radially outer side and a radially inwardly directed annular flange 76 at the free edge of its radially inner side, these flanges bearing against the axially inner faces of the outer edges of the head 66 of the sealing member 65. The backing member 72 is of such dimensions axially of the sealing element that its closed end bears against the end wall 62 of the shell or housing 56 and the flanges 74 and 76 maintain the radially outer and inner margins of the sealing element in sealing engagement with the rings 70 and with the corresponding radially inner and outer walls 58 and 60 of the housing or shell 56.

In this last case, as in the previous case, the resiliency of the material from which the sealing element is made may be relied upon to continue the contact between the leg 68 and the surface 54 during wear between these parts, particularly where the sealing element is initially positioned on the shaft 50 as to tension the sealing element in a direction tending to urge the flange 68 axially to the right as viewed in Fig. 4. However, in this case, as in the first two cases, a garter spring such as 78, shown in Fig. 4, may be employed to accentuate this effect. The garter spring 78 is received in an annular groove 80, similar to the grooves 38 and 38a, formed in the axially outer face of the sealing element in substantial central alignment with the center of the leg 68. In this case, that is the case illustrated in Fig. 4, where the seal is established with a surface normal to the axis of the shaft, then in order for the garter spring 78 to function to press the sealing element axially to the right, the radially inner wall of the backing member 72 is inclined radially outwardly and axially away from the line of intersection of the surface 54 with the surface of the shaft 50 so that the tendency of the spring 78 to contract will tend to shift it axially to the right as viewed in Fig. 4 against the axially inner face of the sealing element and thus urge the sealing element in a corresponding direction to maintain the contact between the leg 68 and the surface 54.

Having thus described my invention, what I claim by Letters Patent is:

1. A fluid seal for rotatable shafts comprising a T-sectioned annular sealing element of pliable character arranged with the free end of the leg of the T for rubbing contact with a surface to be sealed, a rigid annular U-sectioned member arranged in inverted relation on the head of the T with the free edges thereof bearing against the outer ends of the head of the T, and a slotted hollow annular housing encompassing said sealing member and U-sectioned member and through the slot of which the leg of said T projects, the opposite terminal portions of the head of said T being clamped between said U-sectioned member and the slotted wall of said housing.

2. A fluid seal for rotatable shafts comprising a generally T-shaped pliable member including an annular sealing flange and an annular head approximately normal thereto and projecting beyond both sides thereof, a rigid annular U-sectioned member having a pair of legs the termini thereof bearing against the opposite outer portions of said head and forming a chamber about the central portion of said pliable member, and a housing encompassing said head and U-sectioned member clamping the terminal end portions only of the head of said T between it and said U-sectioned member, said pliable member having a passage therethrough at one side of said flange leading into said chamber.

3. A fluid seal for rotatable shafts comprising an annular generally T-sectioned flexible packing member, an offset on one side of the head of the T, a rigid annular U-sectioned member having a pair of legs the termini thereof bearing against the free end portions of the head of the T and one leg thereof positioned against said offset, and a cage encompassing said head of said T and said U-shaped member and clamping the terminal end portions only of the head of said T between it and said U-sectioned member.

4. A self-contained fluid seal comprising, in combination, a hollow annular housing provided with a concentric annular slot in one wall thereof intermediate the opposite margins of said wall, an annular pliable sealing element of generally T-section arranged with the head of said T within said housing with the free ends of the head of said T bearing against said slotted wall on opposite sides of said slot and with the leg of the T projecting through said slot, and a rigid annular U-sectioned member within said housing arranged with the free ends of said U bearing against said ends of said head of said T and pressing said ends against said slotted wall.

ANTHONY P. YAROS.

REFERENCES CITED

The following references are of record in the file of this patent:

UNITED STATES PATENTS

| Number | Name | Date |
| --- | --- | --- |
| 1,963,849 | Johnson | June 19, 1934 |
| 2,257,119 | Johannessen | Sept. 30, 1941 |
| 2,364,781 | Ericsson | Dec. 12, 1944 |

FOREIGN PATENTS

| Number | Country | Date |
| --- | --- | --- |
| 3,503 | Great Britain | 1910 |
| 528,595 | Great Britain | 1940 |
| 549,158 | Great Britain | 1942 |